(12) United States Patent
Yuan et al.

(10) Patent No.: US 9,097,352 B2
(45) Date of Patent: Aug. 4, 2015

(54) RELIEF VALVE FOR OVERLOAD PROTECTION

(75) Inventors: Xunping Yuan, Guangdong (CN); Zhiqiang Tang, Guangdong (CN)

(73) Assignee: ZHUHAI BOW KITCHEN & BATH PRODUCTS CO., LTD., Guangdong (CH)

( * ) Notice: Subject to any disclaimer, the term of this patent is extended or adjusted under 35 U.S.C. 154(b) by 0 days.

(21) Appl. No.: 14/124,335

(22) PCT Filed: Jun. 28, 2012

(86) PCT No.: PCT/CN2012/077732
§ 371 (c)(1),
(2), (4) Date: Dec. 6, 2013

(87) PCT Pub. No.: WO2013/097431
PCT Pub. Date: Jul. 4, 2013

(65) Prior Publication Data
US 2014/0116539 A1    May 1, 2014

(30) Foreign Application Priority Data

Dec. 29, 2011 (CN) .......................... 2011 1 0449711

(51) Int. Cl.
*F16K 31/12* (2006.01)
*F16K 17/02* (2006.01)
(Continued)

(52) U.S. Cl.
CPC ................. *F16K 17/02* (2013.01); *F16K 5/061* (2013.01); *F16K 17/10* (2013.01); *F16K 17/168* (2013.01); *F16K 17/30* (2013.01); *F16K 17/34* (2013.01)

(58) Field of Classification Search
CPC ......... F16K 17/02; F16K 5/061; F16K 17/34; F16K 17/168; F16K 17/30; F16K 17/10
USPC ......... 137/460, 498, 516.11, 517, 513.3, 508, 137/505.11
See application file for complete search history.

(56) References Cited

U.S. PATENT DOCUMENTS 2,806,484 A * 9/1957 Schultz .......................... 137/460
3,093,155 A * 6/1963 Dawes ........................... 137/269
(Continued)

FOREIGN PATENT DOCUMENTS

| CN | 1048746 A | 1/1991 |
| CN | 2072180 U | 2/1991 |

(Continued)

OTHER PUBLICATIONS

International Search Report for International Application No. PCT/CN2012/077732, mailed Oct. 4, 2012 (4 pages)
(Continued)

*Primary Examiner* — Jessica Cahill
(74) *Attorney, Agent, or Firm* — Osha Liang LLP

(57) ABSTRACT

A relief valve for overload protection includes a switching member disposed at the inlet, and a guide pillar in sealed connection with the switching member. The guide pillar is provided with a first water outlet and a second water outlet disposed in the direction of water flowing, and a slidable sleeve is disposed on an outer side of said guide pillar. When the water pipe connected to the outlet cracks, the water pressure at said outlet may drop, which leads to further movement of said slidable sleeve towards the outlet and cause the plug disposed on the top of said slidable sleeve to plug the outlet in a sealed manner, thus closing the outlet.

20 Claims, 3 Drawing Sheets

(51) Int. Cl.
*F16K 5/06* (2006.01)
*F16K 17/10* (2006.01)
*F16K 17/168* (2006.01)
*F16K 17/30* (2006.01)
*F16K 17/34* (2006.01)

(56) References Cited

U.S. PATENT DOCUMENTS

| | | | |
|---|---|---|---|
| 3,689,239 A * | 9/1972 | Eriksson | 48/192 |
| 4,605,039 A * | 8/1986 | Johnson et al. | 137/460 |
| 4,877,052 A | 10/1989 | Toshio et al. | |
| 4,962,831 A * | 10/1990 | Dundas | 184/108 |
| 5,058,618 A | 10/1991 | Bacardit | |
| 5,320,135 A * | 6/1994 | Pierrou | 137/513.3 |
| 7,533,689 B2 * | 5/2009 | Goble | 137/460 |
| 2004/0221893 A1* | 11/2004 | Johnson | 137/498 |
| 2007/0034262 A1 | 2/2007 | Cozens et al. | |
| 2009/0250928 A1* | 10/2009 | Rigamonti et al. | 285/339 |

FOREIGN PATENT DOCUMENTS

| | | |
|---|---|---|
| CN | 2615459 Y | 5/2004 |
| CN | 1928411 A | 3/2007 |
| CN | 201236982 Y | 5/2009 |
| CN | 102494166 A | 6/2012 |

OTHER PUBLICATIONS

Notification of First Office Action issued Nov. 5, 2012, by the State Intellectual Property Office of the People's Republic of China, in corresponding Chinese Application No. 2011104497113, with English translation (7 pages).

Notice of Decision of Granting Patent Right for Invention issued Dec. 5, 2012, in corresponding Chinese Patent Application No. 201110449711.3, with English translation (2 pages).

* cited by examiner

RELIEF VALVE FOR OVERLOAD PROTECTION

CROSS-REFERENCE TO RELATED APPLICATIONS

This is a national stage application based on PCT/CN2012/077732, filed on Jun. 28, 2012, which claims priority to Chinese Patent Application No. CN 201110449711.3, filed on Dec. 29, 2011. This application claims the priority of these prior applications and incorporates their disclosures by reference in their entireties.

TECHNICAL FIELD

This invention relates to a relieve valve for overload protection, in particular, a relieve valve for overload protection used in water circuit control, which is able to close automatically when the corresponding water pipe is ruptured.

BACKGROUND TECHNOLOGY

Water is an important kind of natural resource in people's life. People cannot live without water. With the development of modern society, shortage of water resource is becoming increasingly severe, and water saving has become a topic of great concern. When water is used in daily life, water supply system is established with water supply circuits, and switching valves are disposed at water circuit terminals to control water flow. Under such circumstances, valves at water circuit terminals need to bear certain water pressure, and if a valve is damaged, the water in it will rush out, causing huge amount waste of water resource. If not handled timely, this will not only lead to huge amount waste of water resource, but also cause damage to other assets.

In circuits of natural gas, some relieve valves for overload protection are designed to prevent damage caused by leakage. For instance, Chinese patent CN2615459Y disclosed a relieve valve for overload protection for compressed natural gas circuit, comprising a joint, a valve body, a valve spring, and a valve mandrel. A hollow joint is screwed into the lower end of the valve body through a female screw, a cylindrical cavity is formed at the middle of the valve body, a valve mandrel with air holes thereon is disposed in the cylindrical cavity, a conical valve seat is disposed above the valve mandrel, a valve spring is sleeved on the valve mandrel, and overflow holes are disposed on the upper part of the valve mandrel; coaxial circular venting grooves and hollow slots perpendicular to the same are disposed on the upper section of the cylindrical cavity, repositioning venting bolts are mounted in the circular venting grooves, and screw threads are set on the outer surface of the hollow slots. This relieve valve for overload protection, when its corresponding pipeline is ruptured or damaged, is able to close the gas outlet automatically according to the gas flow rate and differential pressure, so as to prevent leakage of high pressure gas, increase safety level in use, and reduce accident loss. However, while this kind of valve is applied in water circuit, a relatively high pressure is generated by water at one end of the valve mandrel when the valve is opened, because water is in its liquid state and does not diffuse as fast as high pressure gas, and this pressure cannot be released as the overflow holes are relatively small, so that the valve mandrel is apt to move upward as a result of the water pressure, thus blocking the outlet. Therefore, this valve is not suitable for being applied in water circuit control. Besides, after the valve mandrel blocks the outlet, the pressure is mainly concentrated at the top of the valve mandrel with a relatively small area of stress, this may provide enough force in high pressure gas circuit, however, in normal water circuit, because of the relatively small area of stress, the force provided is relatively weak, thus cannot seal the outlet firmly, and the reliability of the system is decreased.

SUMMARY OF THE INVENTION

The present invention aims at solving the technical problem that the relieve valve for overload protection of prior art used in natural gas circuit is not suitable for applying in water circuit control because it is apt to be blocked at the outlet when opening, and the pressure is inadequate when the outlet is blocked, thus provides a relief valve for overload protection which is suitable for being applied in water circuit control.

To solve the aforementioned technical problem, the present invention provides a relief valve for overload protection, comprising a valve body provided with a valve cavity; an inlet and an outlet disposed on each side of the valve body respectively; and a switching member disposed at the inlet and inside the cavity, wherein, the relief valve also comprises a guide pillar in sealed connection with the switching member and communicating internally with the inlet through the switching member, and provided with a first water outlet and a second water outlet disposed in the direction of water flowing; and a slidable sleeve disposed on an outer side of the guide pillar; the slidable sleeve comprises a plug disposed on the top of the slidable sleeve in a sealed manner, adapted for sealing up the outlet; a sliding wall located in the middle of the slidable sleeve, which is adapted for sleeveing on the outer side of the guide pillar in a sealed manner and forming water channel between the sliding wall and an internal wall of the valve body; a osculum disposed on the sliding wall, adapted for communicating with the second water outlet when moving up and down; and a shoulder disposed on the bottom of the slidable sleeve and attached to an external wall of the guide pillar and the internal wall of the valve body; the relief valve further comprises an elastic member disposed on the shoulder in a pressing manner; and a cavity disposed underneath the shoulder, adapted for communicating with the first water outlet.

The slidable sleeve, when moving up and down along the guide pillar, comprises three states of:

initial state: the shoulder of the slidable sleeve is pressed on the valve body by the elastic member; the shoulder of the slidable sleeve is in sealed connection with the external wall of the guide pillar and the internal wall of the valve body; the second water outlet disposed on the guide pillar is sealed by the sliding wall; and the plug disposed on the top of the slidable sleeve keeps clear of the outlet;

first working state: when the slidable sleeve moves upward and the osculum on the sliding wall communicates with the second water outlet of the guide pillar, the plug of the slidable sleeve keeps clear of the outlet;

second working state: the plug seals up the outlet.

The relief valve for overload protection of the present invention further comprises a top water outlet disposed on the top of the guide pillar.

The relief valve for overload protection of the present invention comprises 2 to 6 the second water outlets and the first water outlets respectively, both of which are disposed radial symmetrically.

Under the second working state, the shoulder of the slidable sleeve is located above the second water outlet.

The relief valve for overload protection of the present invention further comprises a pressure releasing vent disposed on the valve body and adapted for communicating with the inside of the guide pillar; and a pressure releasing sealing member disposed on the pressure releasing vent in a sealed manner.

The plug is a convex stage with an increasing sectional area from the top down, and an O-shaped sealing ring is disposed underneath the convex stage.

The switching member is a ball valve controlled through a handle.

The guide pillar and the slidable sleeve have a fixing sleeve disposed therebetween, which is also disposed on the outer side of the guide pillar.

The elastic member is a spring, one end of which is disposed on the shoulder and the other end is secured on the valve body.

Advantages of the relief valve for overload protection of the present invention, compared to prior art, are summarized as follows:

(1) The relieve valve for overload protection of the present invention comprises a switching member disposed at the inlet, and a guide pillar in sealed connection with the switching member and communicating internally with the inlet through the switching member, which may allow all the water coming in through the inlet to flow into the inside of the guide pillar. The guide pillar is provided with a first water outlet and a second water outlet disposed in the direction of water flowing, and a slidable sleeve is disposed on an outer side of the guide pillar. When the switching member is opened, water comes in through the inlet into the inside of the guide pillar, and further flows through the first water outlet into the cavity underneath the shoulder on the bottom of the slidable sleeve. As the water pressure reaches a certain extent, the upward force generated by the water act on the shoulder may propel the entire slidable sleeve to move upward. When the slidable sleeve moved to a position that the osculum on the slidable sleeve communicates with the second water outlet, the water inside the guide pillar may flow through the osculum and the second water outlet into the valve cavity outside the guide pillar, and then flow out through the outlet, thus the relieve valve for overload protection realizes normal water outflow. When the water pipe connected to the outlet cracks, the water pressure at the outlet may drop, which leads to further movement of the slidable sleeve towards the outlet and cause the plug disposed on the top of the slidable sleeve to plug the outlet in a sealed manner, thus closing the outlet. In the relieve valve for overload protection of the present invention, the slidable sleeve is slowly pushed upward by water flowing through the first water outlet on the guide pillar, which prevents the problem that the slidable sleeve moves upward too quickly to close the outlet and cause malfunction. Meanwhile, when the water pressure at the outlet drops because of the cracking of the connected water pipe and the water propels the slidable sleeve to move upward to close the outlet, the water pressure acting on the slidable sleeve is concentrated at the bottom shoulder and at the top, with a relatively large stress area, so as to ensure firm sealing of the outlet, thus prevent waste of water resource, save energy, and avoid danger of water erosion of other assets.

(2) The relieve valve for overload protection of the present invention comprises three states. The initial state is: the switching member is initially not opened, and when it is opened, water inside the guide pillar flows through the first water outlet into the cavity underneath the shoulder on the bottom of the slidable sleeve, and as other parts are all sealed, the resulting water pressure at the bottom shoulder pushes the slidable sleeve to move upward. The first working state when the relieve valve for overload protection is working normally is: water flows into the inside of the guide pillar, flows through the second water outlet into the valve cavity outside the guide pillar, and then flows out through the outlet. The second working state of overload protection is: when the water pipe connected to the outlet cracks or is damaged and the water pressure drops, the slidable sleeve moves further upward to close the outlet in a sealed manner, so as to realize the function of overload protection and achieve the goal of water resource saving.

(3) The relieve valve for overload protection of the present invention further comprises a top water outlet disposed on the top of the guide pillar. When the switching member is opened, water flows into the inside of the guide pillar and is able to flow out through the top water outlet, thus form a pressure on the top of the slidable sleeve, and co-generate a upward force with the water at the bottom shoulder and act this force on the slidable sleeve, so as to ensure smooth upward movement of the slidable sleeve. Besides, as the areas for water outflow set at the top water outlet and the first water outlet are relatively small, the slidable sleeve is unlikely to be pushed directly to the position of the outlet and closes the outlet.

(4) The relieve valve for overload protection of the present invention comprises 2 to 6 second water outlets and first water outlets respectively, which are disposed radial symmetrically. The area of the first water outlet ensures that the slidable sleeve may not suddenly move upward to close the outlet as a result of too much pressure put on it when the valve is initially opened. The area of the second water outlet ensures enough water supply when the valve is working normally.

(5) When the relieve valve for overload protection of the present invention is under the second working state, the bottom shoulder of the slidable sleeve is located above the second water outlet, so that the second water outlet is closed during the upward movement of the slidable sleeve when the water pressure drops at the outlet, thus water inside the guide pillar will not flow into the cavity communicating with the outlet end, so as to reduce the water pressure at the outlet end, and the plug at the top of the slidable sleeve blocks and seals the outlet end, and as a result, the function of overload protection is realized.

(6) The relieve valve for overload protection of the present invention further comprises a pressure releasing vent disposed on the valve body and adapted for communicating with the inside of the guide pillar; and a pressure releasing sealing member disposed on the pressure releasing vent in a sealed manner. When the switching member is switched off or after the cracking of the connected pipe is properly handled, the water pressure inside the guide pillar can be released by switching on the pressure releasing sealing member, and the slidable sleeve is repositioned.

(7) The plug of the relieve valve for overload protection of the present invention is a convex stage with an increasing sectional area from the top down, and an O-shaped sealing ring or a flat gasket is disposed underneath the convex stage. Such structure may realize a better sealing of the outlet, and the performance of sealing of the plug is further ensured by using the O-shaped sealing ring or the flat gasket.

(8) A fixing sleeve disposed between the guide pillar and the slidable sleeve, and on the outer side of the guide pillar, is able to realize a better sliding effect and a better sealing effect by working with the slidable sleeve of the relieve valve for overload protection of the present invention.

(9) The elastic member of the relieve valve for overload protection of the present invention is a spring, one end of which is disposed on the shoulder and the other end is secured on the valve body. The spring presses the slidable sleeve on the valve body, so as to ensure a compact overall structure of the valve, so as to prevent the slidable sleeve from wobbling.

BRIEF DESCRIPTION OF THE DRAWINGS

In order to make the present invention clearly understood more easily, detailed description is further presented below, based on specific embodiments and in conjunction with accompanying drawings, wherein.

The marking numbers in the accompanying drawings are provided as follows: 1—valve body, 2—inlet, 3—outlet, 4—movable ball valve, 41—handle, 5—guide pillar, 52—fixing sleeve, 6—first water outlet, 7—second water outlet, 8—slidable sleeve, 81—plug, 82—sliding wall, 83—osculum, 84—shoulder, 9—water channel, 10—spring, 11—cavity, 12—top water outlet, 13—pressure releasing vent, 14—pressure releasing sealing member, 15—O-shaped sealing ring.

DETAILED DESCRIPTION OF THE EMBODIMENTS

Detailed embodiments of the relieve valve for overload protection of the present invention are provided as follows:

Embodiment 1

Figure 1:
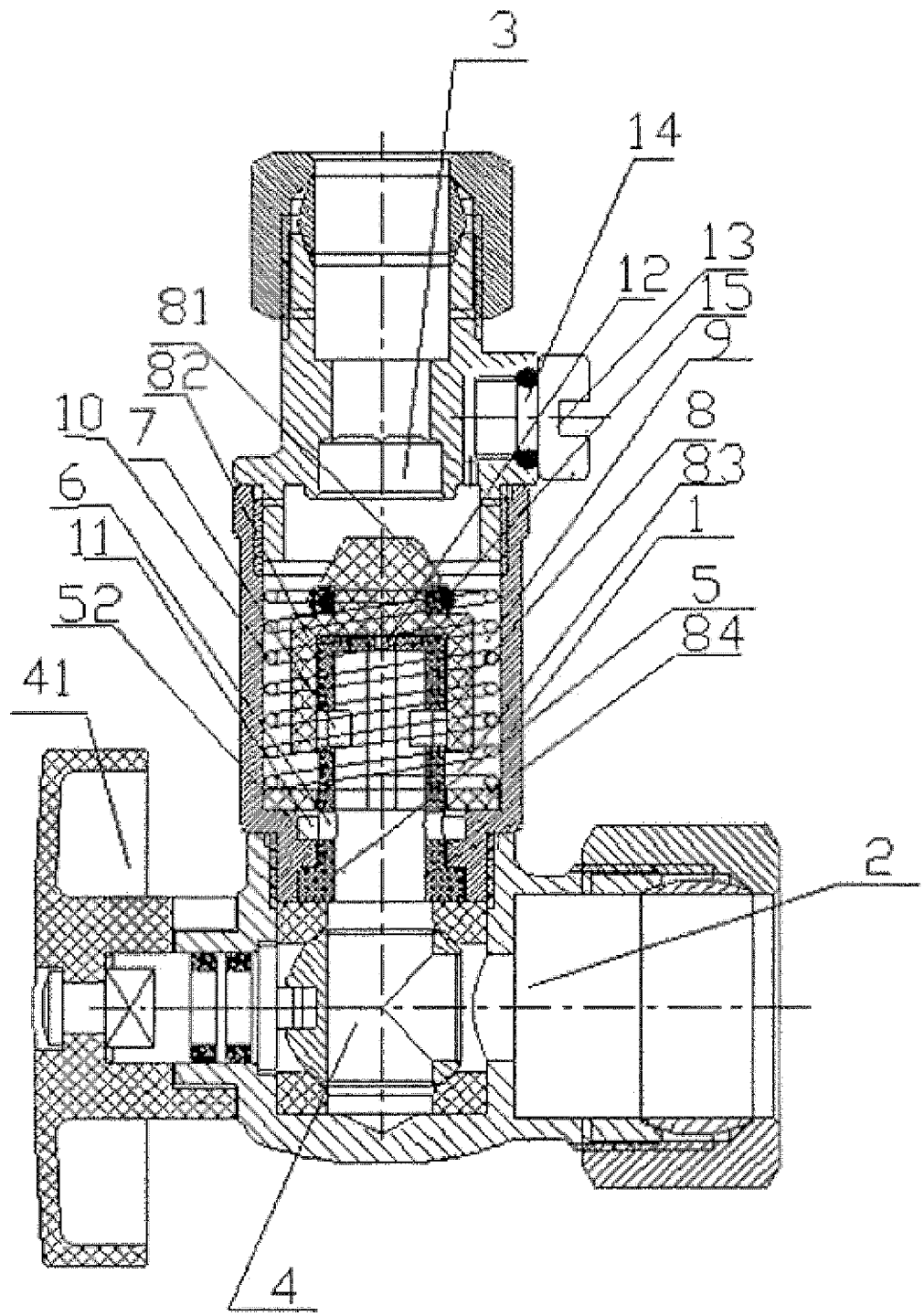
FIG. 1 is a view of the relieve valve for overload protection of the present invention in the initial state.

The relieve valve for overload protection of the present invention, as shown in FIG. 1, comprises a valve body 1 provided with a valve cavity, an inlet 2 and an outlet 3 disposed on each side of the valve body 1 respectively. The relieve valve for overload protection in this embodiment is an angle valve, with the inlet 2 and the outlet 3 forming a right angle, which is used for connection at a turning position. Other valves with the inlet 2 and the outlet 3 connected in a straight line may also be applied. A switching member is disposed at the inlet 2 and inside the cavity. The switching member here in this embodiment is a ball valve 4 controlled through a handle 41. A hollow guide pillar 5 is in sealed connection with the ball valve 4 and communicating internally with the inlet 2 through the ball valve 4, and is provided with a first water outlet 6 and a second water outlet 7 disposed in the direction of water flowing. Two first water outlets 6 and two the second water outlets 7 are disposed radial symmetrically thereon. A slidable sleeve 8 is disposed on an outer side of the guide pillar 5, comprising three parts: a plug 81 on the top, a sliding wall 82 in the middle connected with the plug 81, and a shoulder 84 on the bottom connected with the sliding wall 82. The plug 81, disposed on the top of the slidable sleeve 8 in a sealed manner, is able to seal the outlet 3 after moving upward. The sliding wall 82 is sleeveing on the outer side of the guide pillar 5 in a sealed manner and forming water channel 9 between the sliding wall 82 and an internal wall of the valve body 1, and a osculum 83 disposed on the sliding wall 82 is adapted for communicating with the second water outlet 7 when moving up and down. The shoulder 84 of the slidable sleeve 8 is attached to an external wall of the guide pillar 5 and the internal wall of the valve body 1. An elastic member is disposed on the shoulder 84 in a pressing manner. The elastic member here in this embodiment is a compression spring 10, one end of which is disposed on the shoulder 84 and the other end is secured on the valve body 1. A cavity 11 is disposed underneath the shoulder 84, adapted for communicating with the first water outlet 6.

The working process of the relieve valve for overload protection is as follows:

When the ball valve 4 is opened through the handle 41, water comes through the inlet 2 into the inside of the guide pillar 5, and further flows through the first water outlet 6 of the guide pillar 5 into the cavity 11 underneath the shoulder 84 on the bottom of the slidable sleeve 8, thus forming water pressure inside the cavity 11. When the pressing force formed by the water pressure at the shoulder 84 becomes larger than the pressing force of the spring 10 disposed upon the shoulder 84, the slidable sleeve 8 may be propelled by the water pressure to slowly move upward. After it moves for a certain distance and the osculum 83 on the sliding wall 82 communicates with the second water outlet 7 of the guide pillar 5, the water inside the guide pillar 5 may flow out of the guide pillar 5 through this channel, and may further flow through the water channel 9, which is formed between the sliding wall 82 and the internal wall of the valve body 1, to the outlet 3, thus may realize normal water outflow of the valve. When the water pipe connected to the outlet 3 cracks or is damaged, the water pressure at the outlet 3 may drop, and the water pressure at the inlet 2 may propel the slidable sleeve 8 to move upward, and eventually the outlet 3 is blocked and sealed by the plug 81 disposed on the top of the slidable sleeve 8. Under such circumstances, the force acted on the slidable sleeve 8 is concentrated at the bottom shoulder 84 and at the top internal wall of the slidable sleeve 8, with a relatively large area of stress, so as to ensure firm blocking and sealing of the outlet 3 by the plug 81 on the top of the slidable sleeve 8, thus close the valve and realize the function of overload protection.

Alternatively, the switching member can be a switching valve, such as gate valve, butterfly valve. There may also be disposed radial symmetrically four or six second water outlets 7 and the first water outlets 6 respectively. The area of the second water outlets defines the amount of water outflow, and ensures enough water outflow capacity when the valve is working normally. The first water outlets is used to adjust the speed of upward movement of the slidable sleeve when the valve is initially opened, and prevents the slidable sleeve from blocking the outlet due to quick upward movement of the slidable sleeve.

Embodiment 2

Figure 2:
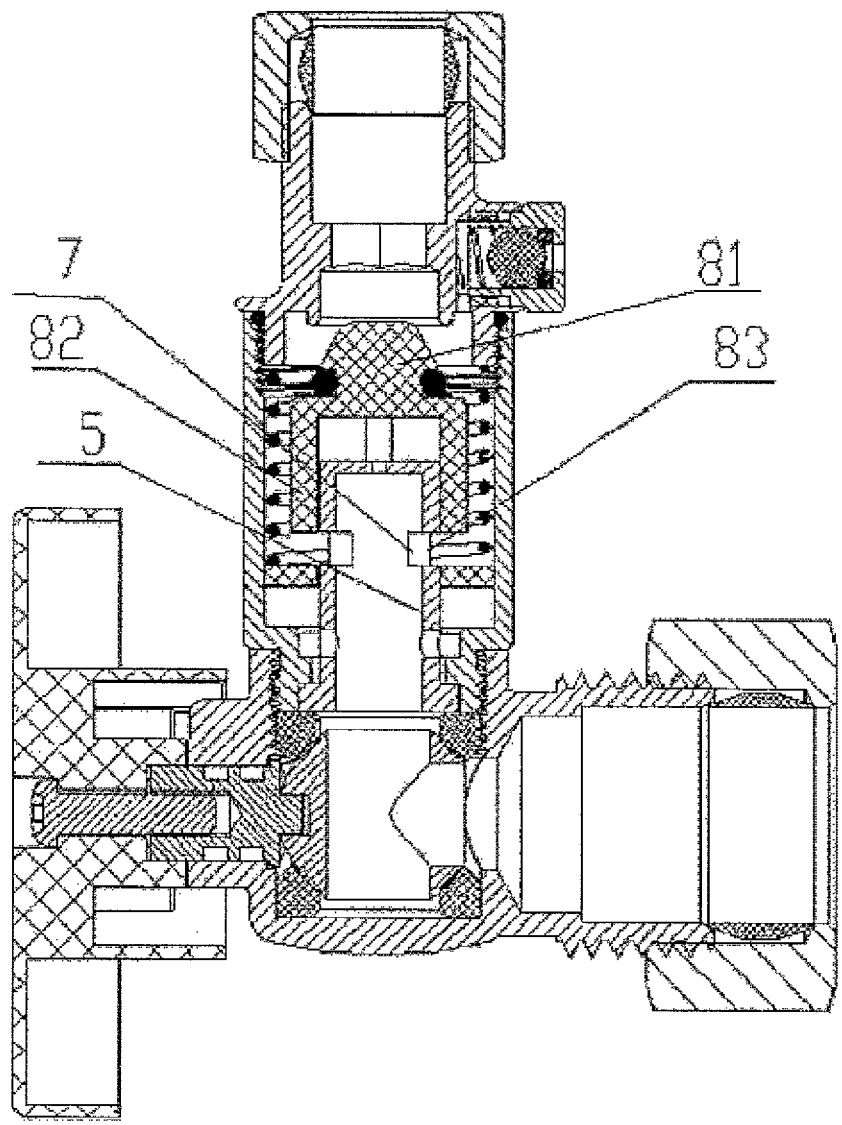
FIG. 2 is a view of the relieve valve for overload protection of the present invention in the first working state.
Figure 3:
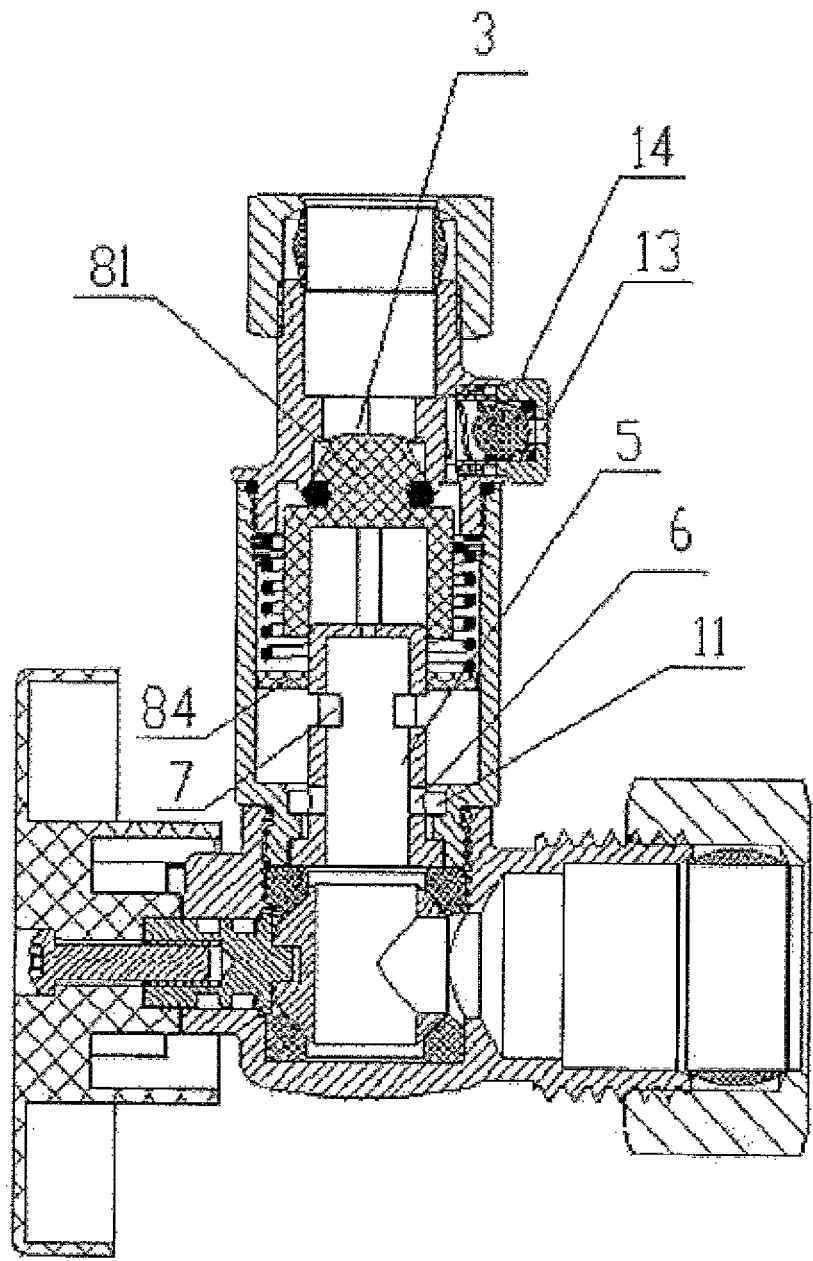
FIG. 3 is a view of the relieve valve for overload protection of the present invention in the second working state.

The slidable sleeve 8, when moving up and down along the guide pillar, comprises three states of:

initial state: as shown in FIG. 1, the shoulder 84 of the slidable sleeve 8 is pressed on the valve body 1 by the elastic member, and the shoulder 84 of the slidable sleeve 8 is in sealed connection with the external wall of the guide pillar 5 and the internal wall of the valve body 1. The sealed connection here in this embodiment ensures that enough pressing force is provided to the shoulder 84 of the slidable sleeve 8 when the switching member is opened. Even if there is tiny clearances between the shoulder 84 and the internal wall of the valve body 1 (or the external wall of the guide pillar), the function of the structure will not be influenced, although the moving speed of the slidable sleeve 8 will be lower when the valve is initially opened. Initially, the second water outlet 7 on the guide pillar 5 is sealed by the sliding wall 82, and the plug 81 on the top of the slidable sleeve 8 keeps clear of the outlet 3.

first working state: as shown in FIG. 2, when the slidable sleeve 8 moves upward to a position that the osculum 83 on the sliding wall 82 communicates with the second water outlet 7 of the guide pillar 5, the plug 81 of the slidable sleeve 8 still keeps clear of the outlet 3.

second working state: as shown in FIG. 3, the plug 81 seals up the outlet 3, and the shoulder 84 of the slidable sleeve 8 is located above the second water outlet 7. When the water pressure at the outlet 3 drops, the relieve valve for overload protection changes from the first working state into the second working state, the second water outlet 7 is firstly closed during the upward movement of the slidable sleeve 8, so that the water inside the guide pillar 5 is unable to flow into the water channel 9 connected to the outlet 3 and the water pressure at the outlet 3 is reduced, and then the plug 81 on the top of the slidable sleeve 8 blocks and seals the outlet 3, thus the function of overload protection is realized. A pressure releasing vent 13 is disposed on the valve body 1 and adapted for communicating with the inside of the guide pillar 5. Here in this embodiment, certain clearances can be set between the shoulder 84 of the slidable sleeve 8 and the internal wall of the valve body 1, so that the pressure releasing vent 13 may be connected to the cavity 11 underneath the shoulder 84 through the clearances, and further communicated with the inside of the guide pillar 5 through the first water outlet 6 and the second water outlet 7. A pressure releasing sealing member 14 is disposed on the pressure releasing vent 13 in a sealed manner. The pressure releasing sealing member 14 here in this embodiment is an elastic ball, and it is possible to allow the inside of the valve body 1 to be communicated with the pressure releasing vent 13 by pressing on the elastic ball, and thus to be communicated with the outside. The elastic ball here may also be replaced by another sealing member that is able to seal or open the pressure releasing vent 13.

Alternatively, under the second working state, the shoulder 84 of the slidable sleeve 8 may not be located above the second water outlet 7. And instead, the osculum 83 on the sliding wall 82 still has a portion that is in connection with the second water outlet 7 of the guide pillar 5, so that the pressure releasing vent 13 on the valve body 1 is communicated with the inside of the guide pillar 5 through the osculum 83 on the sliding wall 82 and the second water outlet 7 of the guide pillar 5. When the relieve valve for overload protection is under the working state of overload protection, after the ball valve 4 is closed and the malfunction of the pipe is handled properly, the pressure releasing vent 13 is communicated with the inside of the guide pillar 5 by pressing on the pressure releasing sealing member 14, the liquid inside the valve body 1 flows out through the pressure releasing vent 13, the spring 10 is repositioned, and the relieve valve for overload protection returns to its initial state.

Embodiment 3

In order to ensure that the slidable sleeve 8 can move upward smoothly to a position that the osculum 83 on the sliding wall 82 communicates with the second water outlet 7 of the guide pillar 5, through providing enough pressing force on the slidable sleeve 8 when the ball valve 4 is opened, a top water outlet 12 is disposed on the top of the guide pillar 5. In order to provide better sliding sealing effect of the slidable sleeve 8 on the guide pillar 5, a fixing sleeve 52 is disposed between the guide pillar 5 and the slidable sleeve 8, and on the outer side of the guide pillar 5. The shape of the fixing sleeve 52 is in correspondence with the guide pillar 5, thus ensures that the slidable sleeve 8 is able to slide smoothly up and down thereon in a sealed manner. In order to ensure the sealing effect of the plug 81 on the top of the slidable sleeve 8, the plug 81 is a convex stage with an increasing sectional area from the top down, and an O-shaped sealing ring 15 is disposed underneath the convex stage. The O-shaped sealing ring 15 here in this embodiment may also be replaced by a flat gasket or other sealing members.

Obviously, the aforementioned embodiments are merely intended for clearly describing the examples, rather than limiting the implementation scope of the invention. For those skilled in the art, various changes and modifications in other different forms can be made on the basis of the aforementioned description. It is unnecessary to describe all the implementation ways herein. However, any obvious changes or modifications derived from the aforementioned description are intended to be embraced within the scope of protection of the present invention.

The invention claimed is:

1. A relief valve for overload protection, comprising:
   a valve body, provided with a valve cavity,
   an inlet and an outlet, disposed on each side of said valve body respectively, and
   a switching member, disposed at said inlet and inside said valve cavity,
   a guide pillar, in sealed connection with said switching member and communicating internally with said inlet through said switching member, and provided with a first water outlet and a second water outlet disposed in the direction of water flow;
   a slidable sleeve, disposed on an outer side of said guide pillar;
      said slidable sleeve comprises
         a plug disposed on the top of said slidable sleeve in a sealed manner, adapted for sealing up said outlet;
         a sliding wall located in the middle of said slidable sleeve, which is adapted for sleeving on the outer side of said guide pillar in a sealed manner and forming a water channel between said sliding wall and an internal wall of said valve body;
         an osculum, disposed on said sliding wall, adapted for communicating with said second water outlet when moving up and down; and
         a shoulder, disposed on the bottom of said slidable sleeve and attached to an external wall of said guide pillar and said internal wall of said valve body;
      an elastic member, disposed on said shoulder in a pressing manner; and
      a cavity, disposed underneath said shoulder, adapted for communicating with said first water outlet.

2. The relief valve for overload protection of claim 1, wherein said plug has a convex-shaped portion with an increasing sectional area from the top down, and an O-shaped sealing ring is disposed underneath said convex-shaped portion.

3. The relief valve for overload protection of claim 1, wherein said switching member is a ball valve controlled through a handle.

4. The relief valve for overload protection of claim 1, wherein said guide pillar and said slidable sleeve have a fixing sleeve disposed therebetween, which is also disposed on the outer side of said guide pillar.

5. The relief valve for overload protection of claim 1, wherein said elastic member is a spring, one end of which is disposed on said shoulder and the other end is secured on said valve body.

6. The relief valve for overload protection of claim 1, comprising 2 to 6 said second water outlets and said first water outlets respectively, both of which are disposed radial symmetrically.

7. The relief valve for overload protection of claim 6, wherein said plug has a convex-shaped portion with an increasing sectional area from the top down, and an O-shaped sealing ring is disposed underneath said convex-shaped portion.

8. The relief valve for overload protection of claim 6, further comprising a top water outlet, disposed on the top of said guide pillar.

9. The relief valve for overload protection of claim 8, wherein, comprising 2 to 6 said second water outlets and said first water outlets respectively, both of which are disposed radial symmetrically.

10. The relief valve for overload protection of claim 8, wherein said plug has a convex-shaped portion with an increasing sectional area from the top down, and an O-shaped sealing ring is disposed underneath said convex-shaped portion.

11. The relief valve for overload protection of claim 1, further comprising a pressure releasing vent, disposed on said valve body and adapted for communicating with the inside of said guide pillar; and a pressure releasing sealing member, disposed on said pressure releasing vent in a sealed manner.

12. The relief valve for overload protection of claim 11, wherein said plug has a convex-shaped portion with an increasing sectional area from the top down, and an O-shaped sealing ring is disposed underneath said convex-shaped portion.

13. The relief valve for overload protection of claim 11, wherein said guide pillar and said slidable sleeve have a fixing sleeve disposed therebetween, which is also disposed on the outer side of said guide pillar.

14. The relief valve for overload protection of claim 11, wherein said elastic member is a spring, one end of which is disposed on said shoulder and the other end is secured on said valve body.

15. The relief valve for overload protection of claim 1, wherein said slidable sleeve, when moving up and down along said guide pillar, comprises three states of:

initial state: said shoulder of said slidable sleeve is pressed on said valve body by said elastic member; said shoulder of said slidable sleeve is in sealed connection with the external wall of said guide pillar and the internal wall of said valve body; said second water outlet disposed on said guide pillar is sealed by said sliding wall; and said plug disposed on the top of said slidable sleeve keeps clear of said outlet;

first working state: when said slidable sleeve moves upward and said osculum on said sliding wall communicates with said second water outlet of said guide pillar, said plug of said slidable sleeve keeps clear of said outlet;

second working state: said plug seals up said outlet.

16. The relief valve for overload protection of claim 15, further comprising a top water outlet, disposed on the top of said guide pillar.

17. The relief valve for overload protection of claim 15, comprising 2 to 6 said second water outlets and said first water outlets, respectively, both of which are disposed radial symmetrically.

18. The relief valve for overload protection of claim 15, wherein said plug has a convex-shaped portion with an increasing sectional area from the top down, and an O-shaped sealing ring is disposed underneath said convex-shaped portion.

19. The relief valve for overload protection of claim 15, wherein, under the second working state, said shoulder of said slidable sleeve is located above said second water outlet.

20. The relief valve for overload protection of claim 19, wherein said plug has a convex-shaped portion with an increasing sectional area from the top down, and an O-shaped sealing ring is disposed underneath said convex-shaped portion.

* * * * *